UNITED STATES PATENT OFFICE.

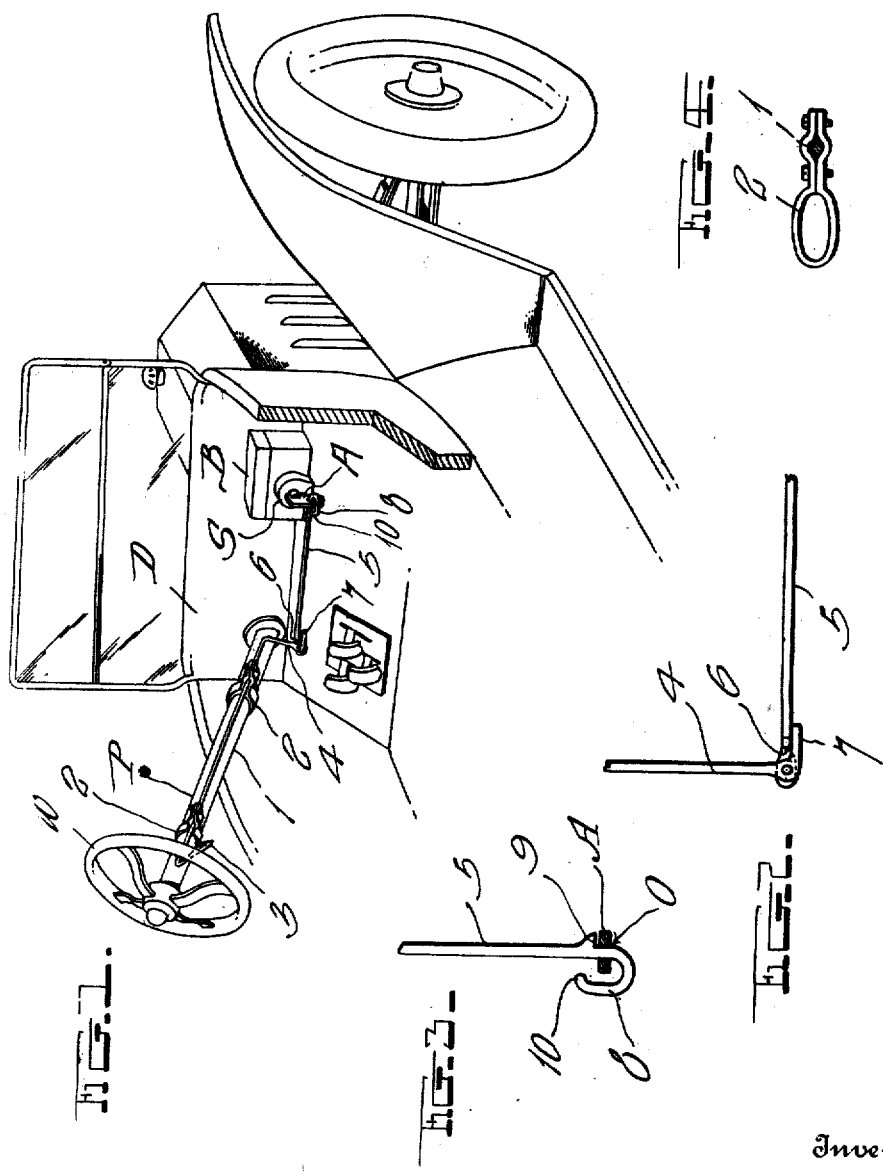

HOMER ERNEST MILLER, OF COLUMBUS, GEORGIA, ASSIGNOR OF ONE-HALF TO WILLIAM EPHRAIM KNOWLES AND ONE-HALF TO EDWARD ELLIS YONGE.

AUTOMOBILE-SWITCH CONTROL.

1,241,752.    Specification of Letters Patent.    Patented Oct. 2, 1917.

Application filed October 16, 1916. Serial No. 125,962.

*To all whom it may concern:*

Be it known that I, HOMER E. MILLER, a citizen of the United States, residing at Columbus, in the county of Muscogee and State of Georgia, have invented certain new and useful Improvements in Automobile-Switch Controls; and I do declare the following to be a full, clear, and exact description of the invention, such as will enable others skilled in the art to which it appertains to make and use the same.

My invention has for its object to provide a simple and inexpensive yet highly efficient and convenient device for controlling the dashboard switches of automobiles from the steering wheels thereof.

With the foregoing general object in view, the invention resides in certain novel features of construction and in unique combinations of parts to be hereinafter fully described and claimed, the descriptive matter being supplemented by the accompanying drawing which constitutes a part of this specification, and in which:

Figure 1 is a perspective view showing the invention applied to the dashboard switch of a Ford automobile;

Fig. 2 is a top plan view of the pivotal joint between the crank arm of the rock shaft and the link which is connected to the switch operating arm;

Fig. 3 is an enlarged horizontal section through the switch operating arm showing more particularly the manner in which the link is connected therewith; and Fig. 4 is a section through the rock shaft showing an edge view of one of the combined bearings and clamps by means of which said shaft is supported from the steering post.

In the drawings above briefly described, S has reference to the usual dashboard switch of a Ford automobile, this switch being commonly mounted on the coil box B in turn carried by the dashboard D. P indicates the steering post, and W the steering wheel, it being the intention of the present device to permit the operator to readily control the laterally swinging arm A of the switch S from said wheel.

An inclined rock shaft 1 is supported from the steering post P by means of combined bearings and clamps 2, the upper end of said shaft having a laterally extending operating arm 3, while the lower end thereof is equipped with a crank arm 4 to which one end of a link 5 is pivoted, said link being offset near its end to provide an upstanding stop 6 which a stop finger 7 is adapted to strike to limit the relative movement of the shaft 1 and link 5, said stop finger being formed by extending the free end of the arm 4 in a lateral direction. The other end of link 5 may be connected to the switch arm A in any preferred manner, but the arrangement now to be described is preferably employed.

The free end of link 5 is shown as provided with a hook 8 adapted to be passed through the usual opening O in the arm A before the latter is inserted into the switch S, and for preventing the link from sliding through said opening, it is provided with a laterally extending stop 9. In addition to this stop, another stop 10 is preferably provided, the latter being formed by bending the bill of the hook 8 inwardly toward the link 5.

The parts 1, 2, 3, 4, 5, 6, and 7 will remain substantially the same regardless of the type of machine upon which the invention is used, but the hook 8 and the stops 9 and 10 are intended primarily for connecting the link 5 with the switch controlling arm of a Ford automobile. It is to be understood, however, that the invention is not limited to any particular make of machine, and that means other than that shown may be employed for connecting the link with the switch controlling arm.

By means of the improved device, the switch may be turned off and on at will, without the necessity of bending over to reach the same. It is of use in coasting down hills since the operator can open the switch without his attention being taken from running of the car, and can again close said switch with as little effort. The device is also of great convenience in stopping the car as the operator can open the switch while the car is in gear, allowing the latter to gradually stop without wear and strain on the brakes and tires. The invention has been found to be a great saver of fuel since a machine equipped therewith can coast down all hills without running the engine under power and without the trouble and annoyance which is often occasioned while the motor is in operation under such conditions.

From the foregoing, the construction, uses and advantages of the improved device will be readily understood, but in conclusion I will state that although certain specific details have been shown and described for illustrative purposes, numerous changes may be made without sacrificing the principal advantages.

I claim:

1. A device for controlling the dashboard switches of automobiles from the steering wheels thereof comprising an inclined rock shaft and means for supporting it from the steering post, a laterally extending operating arm on the upper end of said shaft, a crank arm on the lower end thereof, a link pivoted to said crank arm, means on the free end of said link for connecting it to the laterally swinging operating arm of the switch, and a laterally extending stop finger on the free end of said crank arm for contact with the link to limit the relative movement of the two.

2. A device for controlling the dashboard switches of automobiles from the steering wheels thereof comprising a link having at one end a hook to be passed through an opening in the switch operating arm, a laterally extending stop on said link to prevent it from sliding through said opening, and means for operating said link including a handle adjacent the steering wheel.

3. A device for controlling the dashboard switches of automobiles from the steering wheels thereof comprising a link having at one end a hook to be passed through the opening in the switch controlling arm, the bill of said hook being directed inwardly to prevent the link from sliding through said opening, and means for operating said link including a handle adjacent the steering wheel.

4. A device for controlling the dashboard switches of automobiles from the steering wheels thereof comprising a link having a hook on one end adapted to be passed through an opening in the switch operating arm, the bill of said hook being directed inwardly to form a stop and said link being provided with another stop opposite the one thus formed, said stops serving to prevent the link from sliding through the aforesaid opening, and operating means for said link including a handle adjacent the steering wheel.

5. A device for controlling the dashboard switches of automobiles comprising a link adapted to have one of its ends passed through an opening in the switch key, means for preventing relative shifting of said key and link, and means connected with said link for operating the same to actuate said key.

In testimony whereof I have hereunto set my hand in the presence of two subscribing witnesses.

HOMER ERNEST MILLER.

Witnesses:
WILLIAM E. KNOWLES,
R. B. GUNBY.